US012744306B2

(12) United States Patent
Xue et al.

(10) Patent No.: US 12,744,306 B2
(45) Date of Patent: Sep. 22, 2026

(54) BASE STATION ANTENNA

(71) Applicant: Outdoor Wireless Networks LLC, Claremont, NC (US)

(72) Inventors: Cheng Xue, Suzhou (CN); Fangwen Wan, Suzhou (CN); Changfu Chen, Suzhou (CN); Pengfei Guo, Suzhou (CN); Bin Sun, Suzhou (CN); Jian Zhang, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 77 days.

(21) Appl. No.: 18/912,674

(22) Filed: Oct. 11, 2024

(65) Prior Publication Data

US 2025/0141092 A1 May 1, 2025

(30) Foreign Application Priority Data

Oct. 30, 2023 (CN) ......................... 202311418046.0

(51) Int. Cl.

| | |
|---|---|
| ***H01Q 1/24*** | (2006.01) |
| ***H01Q 19/10*** | (2006.01) |
| ***H01Q 21/22*** | (2006.01) |
| ***H01Q 21/26*** | (2006.01) |

(52) U.S. Cl.

CPC ........... *H01Q 1/246* (2013.01); *H01Q 19/108* (2013.01); *H01Q 21/22* (2013.01); *H01Q 21/26* (2013.01)

(58) Field of Classification Search

CPC ...... H01Q 1/246; H01Q 19/108; H01Q 21/22; H01Q 21/26; H01Q 3/40; H01Q 21/0006; H01Q 21/061; H01Q 21/24

See application file for complete search history.

(56) References Cited

U.S. PATENT DOCUMENTS

| | | | | |
|---|---|---|---|---|
| 10,270,159 | B1 * | 4/2019 | Bryce | H01Q 3/06 |
| 10,651,568 | B2 * | 5/2020 | Barker | H01Q 1/246 |
| 10,841,062 | B2 * | 11/2020 | Nagaraja | H04B 7/06952 |
| 11,056,773 | B2 * | 7/2021 | Kasani | H01Q 3/34 |
| 11,417,944 | B2 * | 8/2022 | Wan | H01Q 21/26 |
| 12,438,279 | B2 * | 10/2025 | Wu | H01Q 21/08 |

* cited by examiner

*Primary Examiner* — Seung H Lee

(74) *Attorney, Agent, or Firm* — Myers Bigel, P.A.

(57) ABSTRACT

A base station antenna comprises first and second RF ports, first and second columns of radiating elements that each extend in a longitudinal direction, and a power coupling circuit. A first radiating element in the second column is coupled to the first RF port via the power coupling circuit, and the phase of the RF signal fed to the first radiating element in the second column is not advanced as compared to the phase of the RF signal fed to the first radiating element in the first column. A second radiating element in the first column is coupled to the second RF port via the power coupling circuit, and the phase of the RF signal fed to the second radiating element in the first column is not advanced as compared to the phase of the RF signal fed to the second radiating element in the second column.

20 Claims, 9 Drawing Sheets

BASE STATION ANTENNA

CROSS-REFERENCE TO RELATED APPLICATION

The present application claims priority to Chinese Patent Application No. 202311418046.0, filed Oct. 30, 2023, the entire content of which is incorporated herein by reference as if set forth fully herein.

FIELD

The present disclosure relates to radio communication, and more specifically to a base station antenna used for cellular communication.

BACKGROUND

Cellular communication systems are well-known in this field. In a typical cellular communication system, a geographical area is divided into a series of regions called "cells," each served by a base station. A base station may consist of baseband equipment, radio equipment, and base station antennas configured to provide two-way radio frequency ("RF") communication with users located throughout the cell. Often, a cell may be divided into a plurality of "sectors," with individual base station antennas providing coverage for each sector. Antennas are typically mounted on towers, with radiation beams generated by each antenna directed outward to provide service to the respective sectors.

A common base station configuration is the so-called "three-sector" configuration, where the cell is divided into three 120° sectors in the azimuth plane. A base station antenna is provided for each sector. In the three-sector configuration, the radiation beams generated by each base station antenna typically have a half-power beam width ("HPBW") of approximately 65° in the azimuth plane, allowing the radiation beams to provide good coverage for the entire 120° sector. Three such base station antennas thus provide complete 360° coverage in the azimuth plane. Typically, each base station antenna comprises a so-called "linear array" of radiating elements that comprises a plurality of radiating elements arranged in a column extending in the longitudinal direction of the base station antenna. Each radiating element may have an HPBW of approximately 65°. By providing a column of radiating elements in the longitudinal direction, the HPBW of the radiation beam in the elevation plane may be significantly narrowed below 65°, with the degree of narrowing increasing with the length of the column in the vertical direction.

FIG. 1 is a schematic front view of the base station antenna associated with the present disclosure. The base station antenna comprises a reflecting plane 10 extending in the longitudinal direction of the antenna and columns 20 and 30 of radiating elements positioned in front of reflecting plane 10 and spaced apart from each other in the transverse direction. Reflecting plane 10 may be provided by at least one surface of a reflector to guide the electromagnetic radiation emitted by the radiating elements forward. Reflecting plane 10 comprises a left edge 11 and a right edge 12. Column 20 comprises radiating elements 21 to 29 arranged in the longitudinal direction, and column 30 comprises radiating elements 31 to 39 arranged in the longitudinal direction. Each radiating element is depicted as an "X"-shaped figure in FIG. 1 and other accompanying drawings herein to indicate that the radiating element is a dual-polarized crossed-dipole radiating element. The dual-polarized crossed-dipole radiating element comprises a first dipole radiator and a second dipole radiator, with the first dipole radiator and the second dipole radiator emitting/receiving signals in orthogonal (respectively tilted −45° and +45°) linear polarizations. The base station antenna also comprises RF ports 41 to 44, which are used to respectively pass first to fourth RF signals between one or more radios and the base station antenna via, for example, RF cables. When the base station antenna is used for 4×4 multiple-input multiple-output (MIMO) applications, the first dipole radiator (e.g., radiator tilted at −45°) of each of radiating elements 21 to 29 in column 20 may be coupled to RF port 41 to be fed with the first RF signal, the second dipole radiator (e.g., radiator tilted at +45°) of each of radiating elements 21 to 29 in column 20 may be coupled to RF port 42 to be fed with the second RF signal, the first dipole radiator of each of radiating elements 31 to 39 in column 30 may be coupled to RF port 43 to be fed with the third RF signal, and the second dipole radiator of each of radiating elements 31 to 39 in column 30 may be coupled to RF port 44 to be fed with the fourth RF signal. In this way, the base station antenna is capable of simultaneously transmitting/receiving signals to/from four paths.

SUMMARY

According to a first aspect of the present disclosure, a base station antenna is provided, comprising a first RF port, a second RF port, a first column of radiating elements that extends in the longitudinal direction, the first column of radiating elements coupled to the first RF port, a second column of radiating elements that extends in the longitudinal direction, the second column of radiating elements coupled to the second RF port, and a power coupling circuit; wherein, a first radiating element in the second column of radiating elements is coupled to the first RF port via the power coupling circuit, and the phase of the RF signal fed to the first radiating element in the second column of radiating elements is not advanced as compared to the phase of the RF signal fed to the first radiating element in the first column of radiating elements; and a second radiating element in the first column of radiating elements is coupled to the second RF port via the power coupling circuit, and the phase of the RF signal fed to the second radiating element in the first column of radiating elements is not advanced as compared to the phase of the RF signal fed to the second radiating element in the second column of radiating elements.

According to a second aspect of the present disclosure, a base station antenna is provided, comprising a reflecting plane extending in the longitudinal direction and an array positioned in front of the reflecting plane; the array comprising: a column formed by a plurality of first radiating elements arranged in the longitudinal direction, where the column is a first distance from a first side edge of the reflecting plane and a second distance from a second side edge of the reflecting plane, where the first distance is not equal to the second distance so that the radiation beam generated by the column has a first squint angle in the azimuth plane; and a second radiating element positioned on one side of the column, where the second radiating element is configured such that there is a phase difference between the RF signal fed thereto and the RF signal fed to a corresponding first radiating element in the column, so that the radiation beam generated by the array has a second squint angle in the azimuth plane that is less than the first squint angle.

Through the following detailed description of exemplary examples of the present disclosure by referencing the attached drawings, other features and advantages of the present disclosure will become clear.

Figure 1:
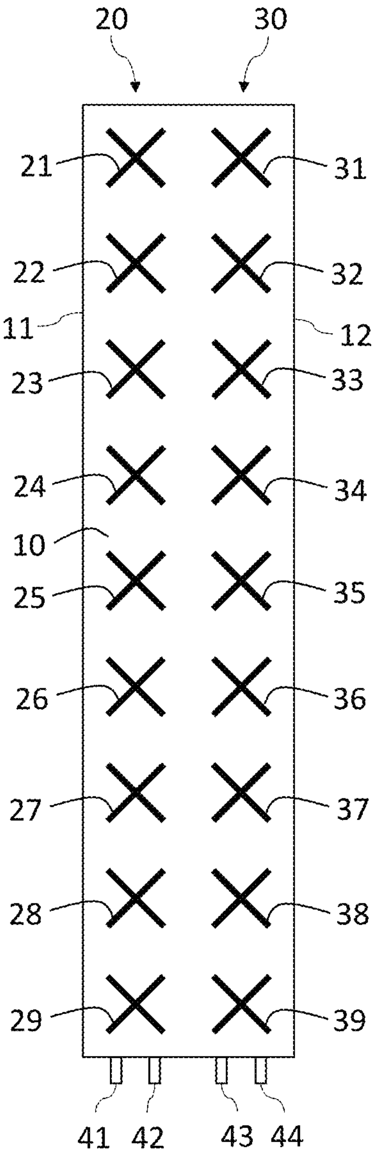
FIG. 1 is a schematic front view of a base station antenna associated with the present disclosure.

It should be noted that in the embodiments described below, the same reference signs are sometimes used across different attached drawings to denote the same parts or parts with similar functions, and repeated descriptions thereof are omitted. In some cases, similar labels and letters are used to denote similar items. Therefore, once an item is defined in one attached drawing, there is no need for further discussion in subsequent attached drawings.

For ease of understanding, the position, dimension, and range of each structure shown in the attached drawings and the like sometimes do not represent the actual position, dimension, and range. Therefore, the present disclosure is not limited to the positions, dimensions, and ranges disclosed in the attached drawings and the like.

DETAILED DESCRIPTION

The present disclosure will be described below with reference to the attached drawings, in which several examples of the present disclosure are illustrated. However, it should be understood that the present disclosure may be presented in various different ways and is not limited to the examples described below; in fact, the examples described below are intended to make the disclosure more complete and to fully inform those skilled in the art of the scope of protection of the present disclosure. It should also be understood that the examples disclosed in the present disclosure may be combined in various ways to provide additional examples.

It should be understood that the terminology used herein is for describing specific examples is not intended to limit the scope of the present disclosure. All terms (including technical and scientific terms) used herein, unless otherwise defined, have the meanings commonly understood by those skilled in the art. For the sake of brevity and/or clarity, well-known functions or structures may not be described in detail.

As used herein, when an element is said to be “on” another element, “attached” to another element, “connected” to another element, “coupled” to another element, or “in contact with” another element, etc., the element may be directly positioned on another element, attached to another element, connected to another element, coupled to another element, or in contact with another element, or an intermediate element may be present. In contrast, if an element is described as “directly” “on” another element, “directly attached” to another element, “directly connected” to another element, “directly coupled” to another element, or “directly in contact with” another element, no intermediate elements are present. As used herein, when one feature is arranged “adjacent” to another feature, it may mean that one feature has a portion overlapping with the adjacent feature or a portion positioned above or below the adjacent feature.

In this specification, there may be mentions of elements, nodes, or features that are “coupled” together. Unless otherwise explicitly stated, “coupled” means that one element/node/feature may be mechanically, electrically, logically, or otherwise linked to another element/node/feature in a direct or indirect manner to allow interaction, even if these two features may not be directly connected. In other words, “coupled” is intended to include both direct and indirect connections of elements or other features, including connections via one or more intermediate elements.

As used herein, spatial relational terms such as “above,” “below,” “left,” “right,” “front,” “back,” “high,” “low,” and the like are used to describe the relationship of one feature to another feature in the attached drawings. It should be understood that spatial relational terms, in addition to the orientations shown in the attached drawings, also encompass different orientations of the apparatus during use or operation. For example, when the apparatus is flipped in the attached drawings, a feature previously described as "below" another feature may now be described as "above" that other feature. The apparatus may also be oriented in other ways (rotated 90 degrees or in other orientations), and the relative spatial relationships will be interpreted accordingly in those cases.

As used herein, the term "A or B" comprises "A and B" and "A or B", not exclusively "A" or "B", unless otherwise specified.

As used herein, the term "exemplary" means "serving as an example, instance, or illustration", rather than as a "model" to be precisely replicated. In this exemplary description, any particular embodiment should not necessarily be interpreted as being preferred or more advantageous compared to other embodiments. Furthermore, the present disclosure is not limited by any expressed or implied theory given in the technical field, background art, summary of the invention, or specific embodiments described above.

As used herein, the term "essentially" means including any minor variations caused by design or manufacturing defects, tolerances of devices or components, environmental influences, and/or other factors. The term "essentially" also allows for the divergence from the perfect or ideal situation due to parasitic effects, noise, and other practical considerations that may be present in the actual implementation.

In addition, for reference purposes only, "first," "second," and similar terms may also be used herein, and thus are not intended to be limiting. For example, unless explicitly stated in context, the use of words such as "first," "second," or other such numerical terms concerning structures or components does not imply any particular order or sequence.

It should also be understood that when the term "comprising/including" is used herein, it indicates the presence of the specified features, steps, operations, units, and/or components but does not exclude the presence or addition of one or more other features, steps, operations, units, and/or components, and/or combinations thereof.

Figure 2A:
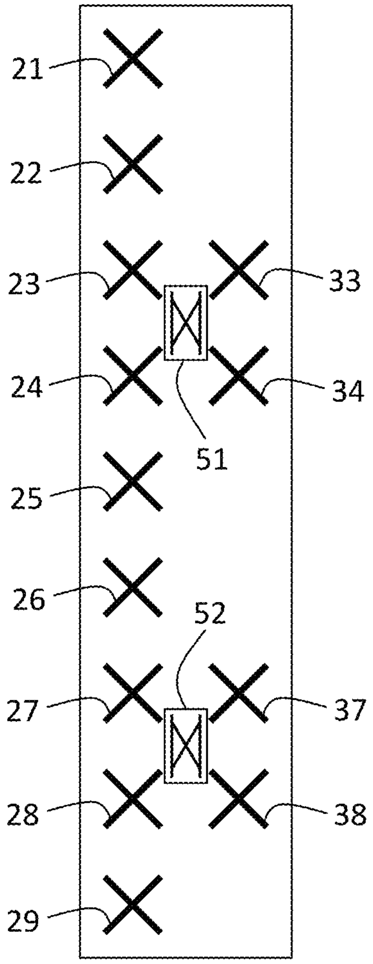
FIGS. 2A and 2B are schematic views of a first array and a second array in the base station antenna associated with the present disclosure, respectively.
Figure 2B:
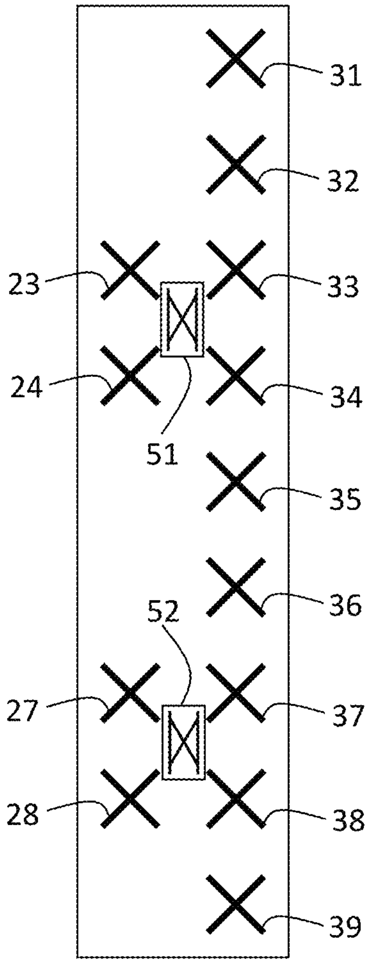

FIGS. 2A and 2B are schematic views of a first array and a second array in the base station antenna associated with the present disclosure, respectively. The base station antenna has a structure similar to or the same as the base station antenna shown in FIG. 1, and for simplicity, the RF ports are not shown.

To narrow the radiation beam generated by column 20 in the azimuth plane, at least one radiating element that is transversely spaced apart from column 20 may transmit/receive the same signal as column 20. In this way, the at least one radiating element and the radiating elements in column 20 may form a first array. The width of the radiation beam generated by the first array in the azimuth plane, for example, the HPBW, is smaller than the width of the radiation beam generated by the radiating elements in column 20 in the azimuth plane. As shown in FIG. 2A, the first array comprises column 20 formed by radiating elements 21 to 29 arranged in the longitudinal direction of the base station antenna, and radiating elements 33, 34, 37, and 38 positioned on the right side of column 20 (from the perspective of an observer in the front view). Radiating elements 33, 34, 37, and 38 are selected ones of the radiating elements of column 30 (which is positioned to the right of column 20). The radiating elements of column 20 are coupled to RF ports 41 and 42, radiating elements 33 and 34 are coupled to RF ports 41 and 42 via a first power coupling circuit 51, and radiating elements 37 and 38 are coupled to RF ports 41 and 42 via a second power coupling circuit 52, thereby enabling column 20 and radiating elements 33, 34, 37, and 38 to transmit/receive the same signals. Specifically, the first radiators of radiating elements 21 to 29 in column 20 and the first radiators of radiating elements 33, 34, 37, and 38 are coupled to RF port 41 via the feed circuit, and the second radiators of radiating elements 21 to 29 in column 20 and the second radiators of radiating elements 33, 34, 37, and 38 are coupled to RF port 42 via the feed circuit, thereby enabling the respective emission/reception of corresponding signals. It should be noted that the structure of any of radiating elements 33, 34, 37, and 38 may be the same as or different from the structure of the radiating elements in column 20, as long as they can transmit/receive the same signals.

Similarly, to narrow the radiation beam generated by column 30 in the azimuth plane, at least one radiating element spaced apart from column 30 may be transversely spaced apart from column 30, and this at least one radiating element transmits/receives the same signal as column 30. In this way, the at least one radiating element and the radiating elements in column 30 may form a second array. The width of the radiation beam generated by the second array in the azimuth plane, for example, the HPBW, is smaller than the width of the radiation beam generated by the radiating elements in column 30 in the azimuth plane. As shown in FIG. 2B, the second array comprises column 30 formed by radiating elements 31 to 39 arranged in the longitudinal direction of the base station antenna, and radiating elements 23, 24, 27, and 28 positioned on the left side of column 30 (from the perspective of an observer in the front view). Radiating elements 23, 24, 27, and 28 are selected ones of the radiating elements of column 20 (which is positioned to the left of column 30). The radiating elements of column 30 are coupled to RF ports 43 and 44, radiating elements 23 and 24 are coupled to RF ports 43 and 44 via the first power coupling circuit 51, and radiating elements 27 and 28 are coupled to RF ports 43 and 44 via the second power coupling circuit 52, thereby enabling column 30 and radiating elements 23, 24, 27, and 28 to transmit/receive the same signals. Specifically, the first radiators of radiating elements 31 to 39 in column 30 and the first radiators of radiating elements 23, 24, 27, and 28 may be coupled to RF port 43 via the feed circuit, and the second radiators of radiating elements 31 to 39 in column 30 and the second radiators of radiating elements 23, 24, 27, and 28 may be coupled to RF port 44 via the feed circuit, thereby enabling the respective emission/reception of corresponding signals. It should be noted that the structure of any of radiating elements 23, 24, 27, and 28 may be the same as or different from the structure of the radiating elements in column 30, as long as they can transmit/receive the same signals.

Figure 3:
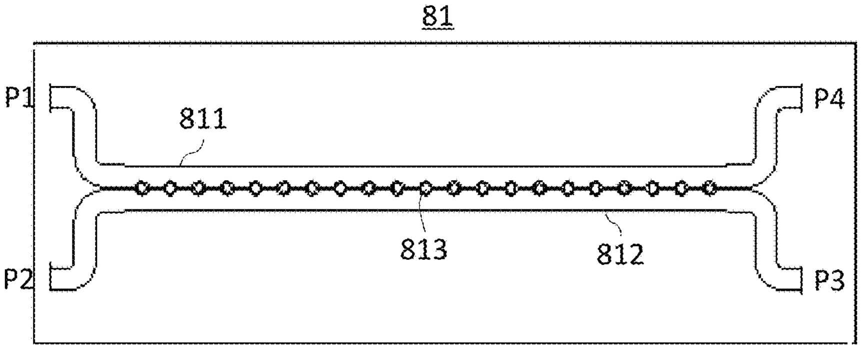
FIG. 3 is a schematic front view of a directional coupler associated with the present disclosure.

FIG. 3 is a schematic front view of a directional coupler 81 (referred to as "coupler 81" herein) that may be used to implement the aforementioned first power coupling circuit 51 and second power coupling circuit 52. It should be understood that in the case where coupler 81 is a microstrip coupler, each component shown in the diagram may be implemented as a conductive trace on a dielectric substrate (and a metal ground plane may be provided on the opposite side of the dielectric substrate). Coupler 81 comprises conductive lines 811 and 812 which, as noted above, can be implemented as conductive traces. The middle portion of conductive line 811 is situated close to and extends in parallel with the middle portion of conductive line 812 with an interspacing (i.e., a small gap therebetween), allowing for electrical isolation and mutual coupling between conductive lines 811 and 812. The edge of the middle portion of conductive line 811 that is adjacent to conductive line 812 is configured with a plurality of first recessed portions arranged at intervals, and the edge of the middle portion of conductive line 812 that is adjacent to conductive line 811 is configured with a plurality of second recessed portions arranged at intervals. The plurality of first recessed portions form a perturbation structure at the edge of the conductive wire 811, and the plurality of second recessed portions form a perturbation structure at the edge of the conductive wire 812, such that coupler 81 may have improved directivity. Additionally, coupler 81 may further comprise a plurality of intermediate conductors 813 disposed between respective first recessed portions and opposed second recessed portions. The intermediate conductors 813 are coupled to conductive line 811 at respective first recessed portions, and are coupled to conductive line 812 at respective second recessed portions, which may further improve the directivity of coupler 81.

Coupler 81 also comprises four ports, P1 to P4. The first end of conductive line 811 forms port P1, and the second end of conductive line 811 forms port P4. The first end of conductive line 812 forms port P2, and the second end of conductive line 812 forms port P3. Any of ports P1, P2, P3, and P4 may be used as the input port for coupler 81. In one example, port P1 may be used as the input port for coupler 81. In this case, port P4 is the output port of coupler 81, port P2 is the coupled port, and port P3 is the isolated port. When the input signal is transmitted to conductive line 811 through port P1 (used as the input port in this case), the first component of the input signal's energy is transmitted along conductive line 811 to port P4 (used as the output port), and the second component of the input signal's energy is coupled to conductive line 812. In ideal conditions, the second component of the input signal's energy propagates along conductive line 812 and is completely transmitted to port P2 (used as the coupled port), while port P3 (used as the isolated port) has no energy output. In this ideal scenario, there is complete isolation between port P1 and port P3, and coupler 81 exhibits ideal directivity.

Figure 4:
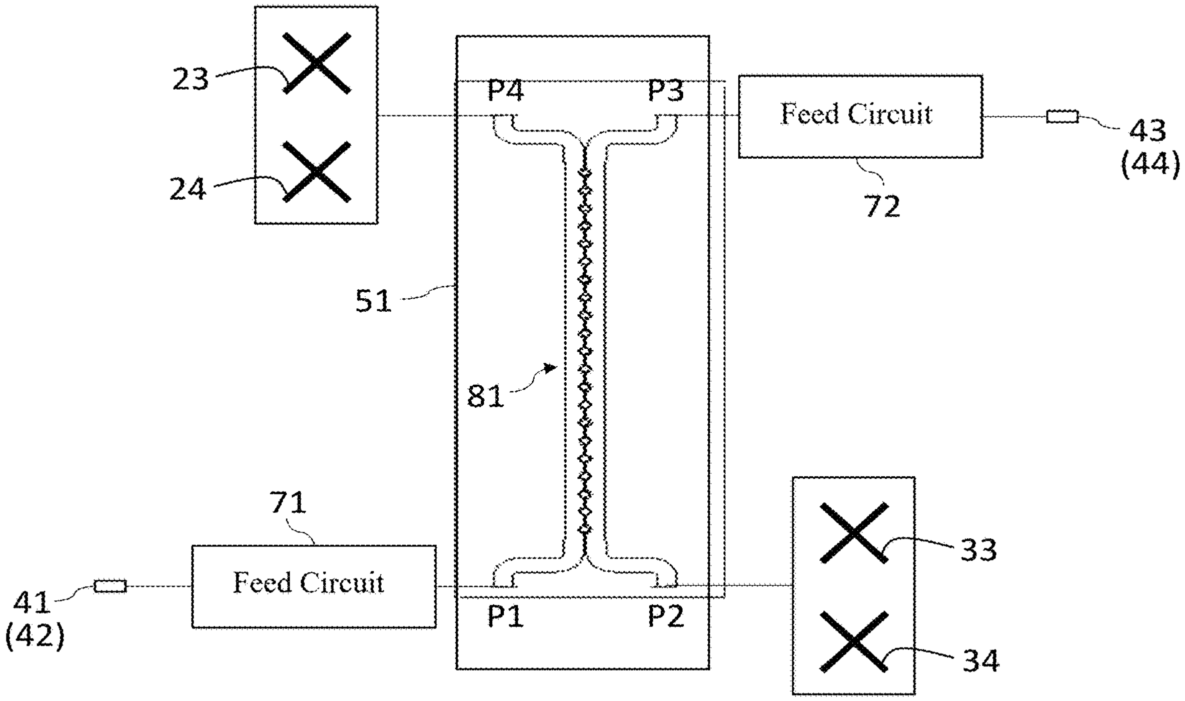
FIG. 4 is a schematic view of an implementation of a power coupling circuit using the directional coupler shown in FIG. 3 in the base station antenna associated with the present disclosure.

FIG. 4 is a schematic view of an implementation of a power coupling circuit as described above, using the directional coupler 81 shown in FIG. 3 in the base station antenna associated with the present disclosure. It should be understood that, for the sake of simplicity, FIG. 4 merely provides a schematic illustration of the implementation of the first power coupling circuit 51, and those skilled in the art are capable of deriving the corresponding implementation of the second power coupling circuit 52 accordingly.

From the perspective of the first power coupling circuit 51 used to feed signals to the first array, as shown in FIG. 4, port P1 of coupler 81 (used as the input port in this case) is coupled to RF port 41 (or 42) via feed circuit 71 dedicated to the first array, to receive the first RF signal for the first array. Port P4 (used as the output port in this case) is coupled to radiating elements 23 and 24 in column 20, to feed the first component of the first RF signal to radiating elements 23 and 24. Port P2 (used as the coupled port in this case) is coupled to radiating elements 33 and 34 in column 30, to feed the second component of the first RF signal to radiating elements 33 and 34. From the perspective of the first power coupling circuit 51 used to feed signals to the second array, port P3 of coupler 81 (used as the input port in this case) is coupled to RF port 43 (or 44) via feed circuit 72 dedicated to the second array, to receive the second RF signal for the second array. Port P2 (used as the output port in this case) is coupled to radiating elements 33 and 34 in column 30, to feed the first component of the second RF signal to radiating elements 33 and 34. Port P4 is coupled to radiating elements 23 and 24 in column 20, to feed the second component of the second RF signal to radiating elements 23 and 24.

Figure 5A:
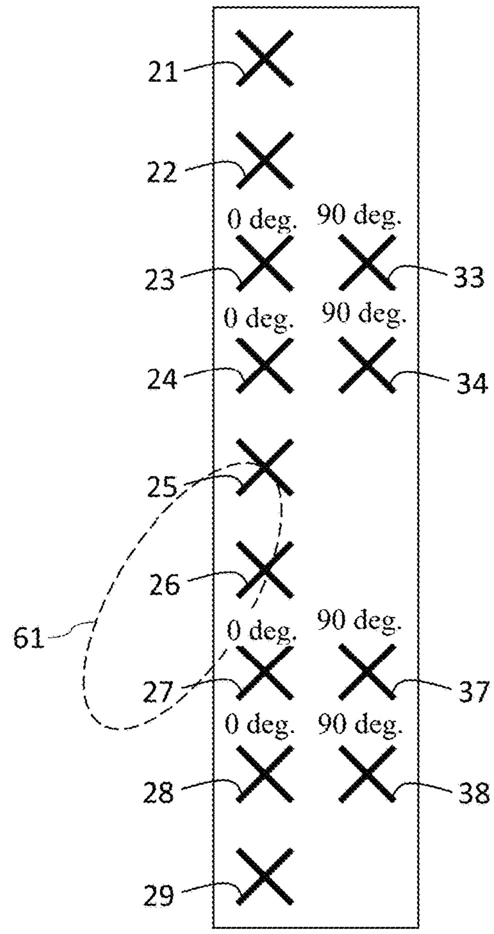
FIGS. 5A and 5B are schematic views of the relative phase of partially fed signals and radiation beams for the first array in FIG. 2A and the second array in FIG. 2B, respectively, when powered using the power coupling circuit shown in FIG. 4.
Figure 5B:
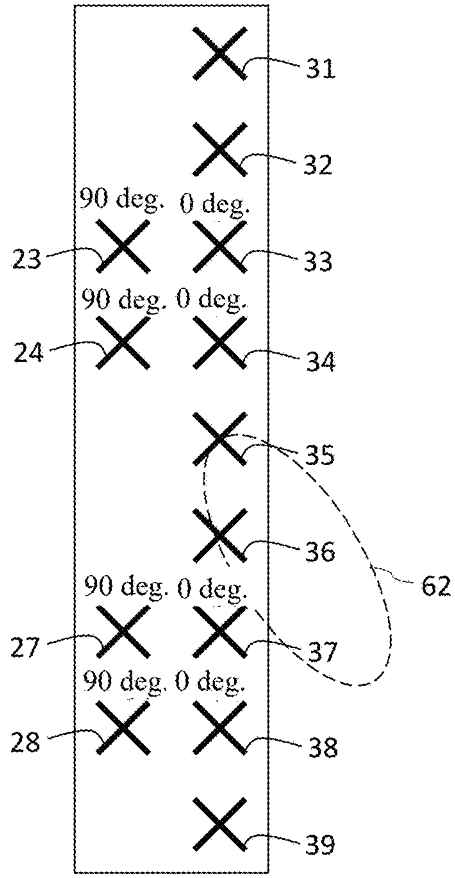

The inventor(s) of the present application have found that implementing the power coupling circuit as shown in FIG. 4 will cause a squint of the radiation beam of the array in the azimuth plane. The signal output from the coupled port of the directional coupler is phase-advanced by 90 degrees compared to the signal output from the output port. For example, when port P1 is used as the input port, the signal output from port P2 is phase-advanced by 90 degrees compared to the signal output from port P4; and when port P3 is used as the input port, the signal output from port P4 is phase-advanced by 90 degrees compared to the signal output from port P2. FIGS. 5A and 5B illustrate the relative phase of the fed signals for partial radiating elements in the first array of FIG. 2A and the second array of FIG. 2B, respectively, when powered using the power coupling circuits shown in FIG. 4, i.e., when the first power coupling circuit 51 and the second power coupling circuit 52 are implemented as shown in FIG. 4. It can be seen that among the signals fed to the first array, as shown in FIG. 5A, the signals fed to radiating elements 33 and 34 are phase-advanced by 90 degrees relative to the signals fed to radiating elements 23 and 24, and the signals fed to radiating elements 37 and 38 are phase-advanced by 90 degrees relative to the signals fed to radiating elements 27 and 28. Among the signals fed to the second array, as shown in FIG. 5B, the signals fed to radiating elements 23 and 24 are phase-advanced by 90 degrees relative to the signals fed to radiating elements 33 and 34, and the signals fed to radiating elements 27 and 28 are phase-advanced by 90 degrees relative to the signals fed to radiating elements 37 and 38. It should be understood that the words "0 degrees" and "90 degrees" in the diagrams represent the relative phase between the corresponding radiating elements, and are not intended to define the absolute phase of the fed signals to the respective radiating elements.

The phase difference between the signals fed to the transversely distributed radiating elements will cause a squint of the radiation beam jointly generated by these radiating elements in the azimuth plane, i.e., the direction of maximum radiation is not the direction normal to the reflecting plane (direction of 0-degree azimuth angle) but deviates from that direction. In the case shown in FIG. 5A, the aforementioned phase difference causes a squint of the radiation beam of the first array towards the side of radiating elements with phase-delayed signals in the azimuth plane, i.e., it deviates towards the left side in FIG. 5A, as schematically illustrated by the squint direction of radiation beam 61 in FIG. 5A. In the case shown in FIG. 5B, the aforementioned phase difference causes a squint of the radiation beam of the second array towards the side of radiating elements with phase-delayed signals in the azimuth plane, i.e., it deviates towards the right side in FIG. 5B, as schematically illustrated by the squint direction of radiation beam 62 in FIG. 5B.

Furthermore, the inventor(s) of the present application have also found that the squint of the radiation beam caused by the aforementioned phase difference may superimpose with the squint of the radiation beam caused by the array not positioned at the center of the reflecting plane, resulting in an increased squint angle of the radiation beam. For example, for the first array as shown in FIG. 5A, its main radiated energy comes from column 20, which is not positioned at the center of the reflecting plane 10; compared to right edge 12, column 20 is closer to left edge 11. Therefore, the radiation beam of the first array will squint towards left edge 11 of reflecting plane 10, as shown in the squint direction of radiation beam 61. This is superimposed with the aforementioned squint of the radiation beam caused by the phase difference, resulting in a further leftward squint of radiation beam 61 generated by the first array, creating a larger leftward squint angle in the azimuth plane. For the second array, as shown in FIG. 5B, its main radiated energy comes from column 30, and column 30 is closer to right edge 12 of reflecting plane 10 compared to left edge 11. Therefore, the radiation beam of the second array will squint towards right edge 12 of reflecting plane 10, as shown in the squint direction of radiation beam 62. This is superimposed with the aforementioned squint of the radiation beam caused by the phase difference, resulting in a further rightward squint of radiation beam 62 generated by the second array, creating a larger rightward squint angle in the azimuth plane.

Based on the above analysis, the inventor(s) of the present application propose an improved base station antenna to mitigate the squint of the radiation beams in the azimuth plane. In the base station antenna according to an embodiment of the present disclosure, the power coupling circuit introduces a phase difference between the RF signals fed to the radiating elements positioned on one side of the column and the RF signals fed to corresponding radiating elements within the column, which is capable of reducing or eliminating the azimuth squint of the radiation beam caused by the reflecting plane. For example, if a majority of the radiated energy of the radiating element array is closer to a first side of the reflecting plane, the phase of the signal fed to the radiating elements closer to a second side of the array is configured to be delayed compared to the phase of the signal fed to the radiating elements closer to the first side of the array.

Figure 6:
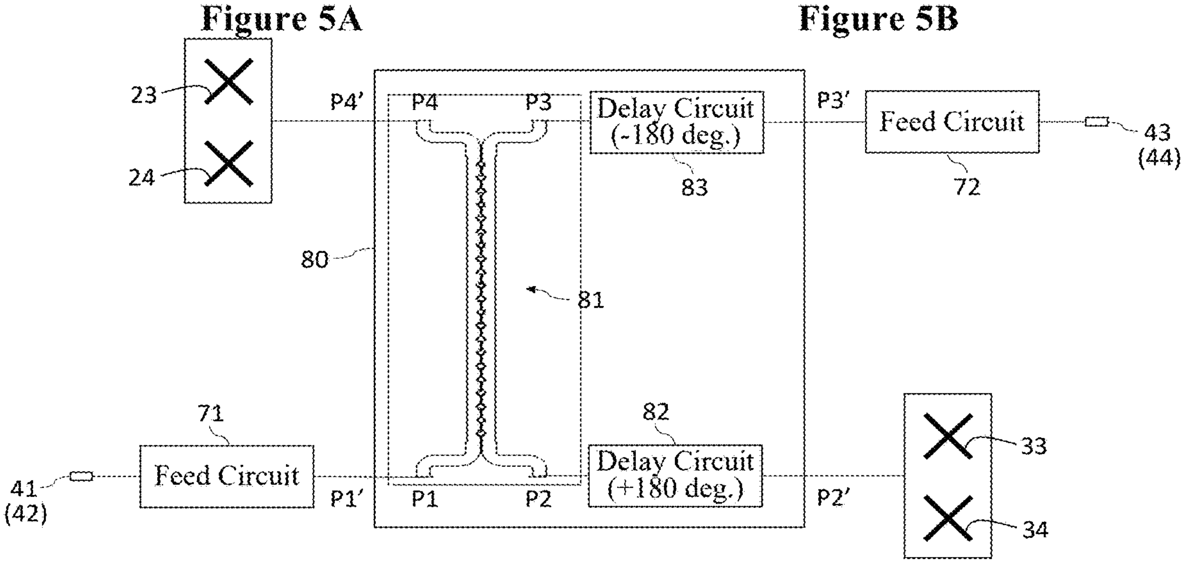
FIG. 6 is a schematic view of an implementation of a power coupling circuit using the directional coupler shown in FIG. 3 in the base station antenna according to an example of the present disclosure.

FIG. 6 is a schematic view of the implementation of a power coupling circuit using directional coupler 81 shown in FIG. 3 in the base station antenna according to an embodiment of the present disclosure. The power coupling circuit in the base station antenna according to an embodiment of the present disclosure is represented as power coupling circuit 80. Power coupling circuit 80 comprises port P1' to port P4'. Port P1 of directional coupler 81 is used as port P1' of power coupling circuit 80, port P2 of directional coupler 81 is coupled to port P2' of power coupling circuit 80 via the first delay circuit 82, port P3 of directional coupler 81 is coupled to port P3' of power coupling circuit 80 via the second delay circuit 83, and port P4 of directional coupler 81 is used as port P4' of power coupling circuit 80. Among them, the first delay circuit 82 causes the signal at port P2' to be phase-advanced by 180 degrees compared to the signal at port P2. The first delay circuit 82 may be implemented by shortening the original transmission line between port P2 and radiating elements 33 and 34, for example, shortening the original transmission line by half the wavelength corresponding to the center frequency of the operating frequency band of the first array, or it may be implemented using a delay device, for example, a commercially available phase shifter. It should be understood that since a signal with 180-degree phase advance is exactly one cycle ahead of a signal with 180-degree phase delay, the first delay circuit 82 may be implemented using a circuit that introduces a 180-degree phase delay. The first delay circuit 83 causes the signal at port P3' to be phase-delayed by 180 degrees compared to the signal at port P3. The second delay circuit 83 may be implemented by using a transmission line of a length equal to half a wavelength (e.g., wavelength corresponding to the center frequency of the operating frequency band of the first array), by using a delay device, or by using a circuit that introduces a 180-degree phase advance.

In the illustrated embodiment, the first delay circuit 82 causes the output signal to be phase-advanced by 180 degrees compared to the input signal, and the second delay circuit 83 causes the output signal to be phase-delayed by 180 degrees compared to the input signal, such that the electrical length from port P3' to port P2' is equal to the electrical length from port P4' to port P1'. However, in other embodiments, the first delay circuit 82 may cause the output signal to be phase-delayed by 180 degrees compared to the input signal, while the second delay circuit 83 may cause the output signal to be phase-advanced by 180 degrees compared to the input signal, such that the electrical length from port P3' to port P2' is equal to the electrical length from port P4' to port P1'. Thus, the functions of the first delay circuit 82 and the second delay circuit 83 are interchangeable.

Due to the 90-degree phase advance of the signal output from the coupled port compared to the signal output from the output port of directional coupler 81, when port P1' of power coupling circuit 80 is used as the input port, the signal at port P2 is phase-advanced by 90 degrees as compared to the signal at port P4. Due to the presence of the first delay circuit 82, the signal at port P2' is phased-advanced by 270 degrees as compared to the signal at port P4' which is equivalent to being phased-delayed by 90 degrees. When port P3' of power coupling circuit 80 is used as the input port, the signal at port P4 is phase-advanced by 90 degrees as compared to the signal at port P2. Due to the presence of both the first delay circuit 82 and the second delay circuit 83, a 90-degree phase delay of the signal at port P4' as compared to the signal at port P2.

As shown in FIG. 6, port P1' of power coupling circuit 80 is coupled to RF port 41 (or 42) via feed circuit 71 dedicated to the first array to receive the first RF signal for the first array. Port P4' is coupled to radiating elements 23 and 24 in column 20 to feed the first component of the first RF signal to radiating elements 23 and 24, and port P2' is coupled to radiating elements 33 and 34 in column 30 to feed the second component of the first RF signal to radiating elements 33 and 34. As described above, when port P1' of power coupling circuit 80 is used as the input port, the signal at port P2' is phase-delayed by 90 degrees as compared to the signal at port P4'. Therefore, for the first array, the signal fed to radiating elements 33 and 34 is phase-delayed by 90 degrees as compared to the signal fed to radiating elements 23 and 24. Similarly, port P3' of power coupling circuit 80 is coupled to RF port 43 (or 44) via feed circuit 72 dedicated to the second array to receive the second RF signal for the second array. As port P2' is coupled to radiating elements 33 and 34 in column 30, a first component of the second RF signal may be fed to radiating elements 33 and 34. As port P4' is coupled to radiating elements 23 and 24 in column 20, a second component of the second RF signal may be fed to radiating elements 23 and 24. When port P3' of power coupling circuit 80 is used as the input port, the signal at port P4' is phase-delayed by 90 degrees as compared to the signal at port P2'. Therefore, for the second array, the signal fed to radiating elements 23 and 24 is phase-delayed by 90 degrees as compared to the signal fed to radiating elements 33 and 34. Since the operation of the second array is symmetric to that of the first array, the following description, in conjunction with the illustrations in FIGS. 7A and 7B, focuses on the first array as an example.

Figure 7A:
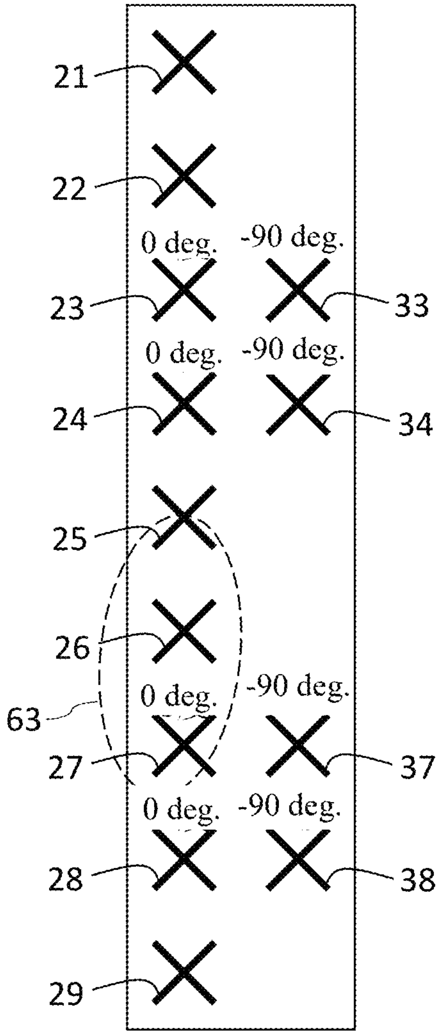
FIG. 7A is a schematic view of the relative phase of partially fed signals and the radiation beam of the first array when the power coupling circuit shown in FIG. 6 is applied to the first power coupling circuit and the second power coupling circuit in FIG. 2A.

FIG. 7A is a schematic view of the relative phase of signals fed to partial radiating elements in the first array and the radiation beam of the first array when power coupling circuit 80, as depicted in FIG. 6, is used to implement the first and second power coupling circuits 51, 52 in FIG. 2A. In this case, the signal fed to radiating elements 33 and 34 is phase-delayed by 90 degrees as compared to the signal fed to radiating elements 23 and 24, and the signal fed to radiating elements 37 and 38 is phase-delayed by 90 degrees as compared to the signal fed to radiating elements 27 and 28, thereby causing the radiation beam formed by the first array to squint towards the side of the radiating elements with the phase-delayed signals, i.e., towards the right side where radiating elements 33, 34, 37, and 38 are located. Therefore, on the basis that the radiation beam generated by the first array squints towards the left side due to a majority of the radiated energy of the first array being closer to the left side of the reflecting plane, the application of power coupling circuit 80 is able to reduce or even eliminate the squint angle of the radiation beam of the first array, as illustrated by beam 63 in the diagram.

Figure 7B:
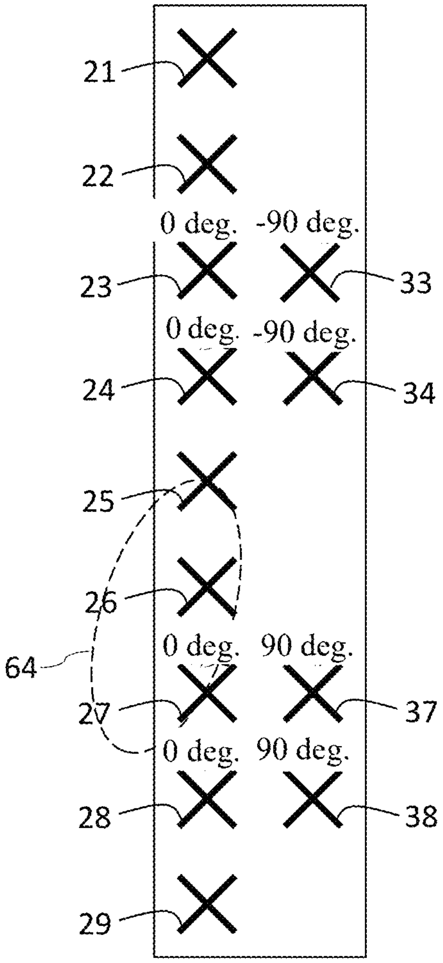
FIG. 7B is a schematic view of the relative phase of partially fed signals and the radiation beam of the first array when the power coupling circuit shown in FIG. 6 is applied to the first power coupling circuit in FIG. 2A.

FIG. 7B is a schematic view of the relative phase of partially fed signals in the first array and the radiation beam of the first array when power coupling circuit 80 shown in FIG. 6 is only used to implement the first power coupling circuit 51 in FIG. 2A. In this case, the signal fed to radiating elements 33 and 34 is phase-delayed by 90 degrees as compared to the signal fed to radiating elements 23 and 24, while the signal fed to radiating elements 37 and 38 is phase-advanced by 90 degrees as compared to the signal fed to radiating elements 27 and 28, as shown in FIG. 5A. Therefore, compared to the case in FIG. 5A, the squint angle of the radiation beam generated by the first array will also decrease, as shown by beam 64 in the diagram. However, the extent of this decrease is not as pronounced as shown in FIG. 7A.

Figure 14:
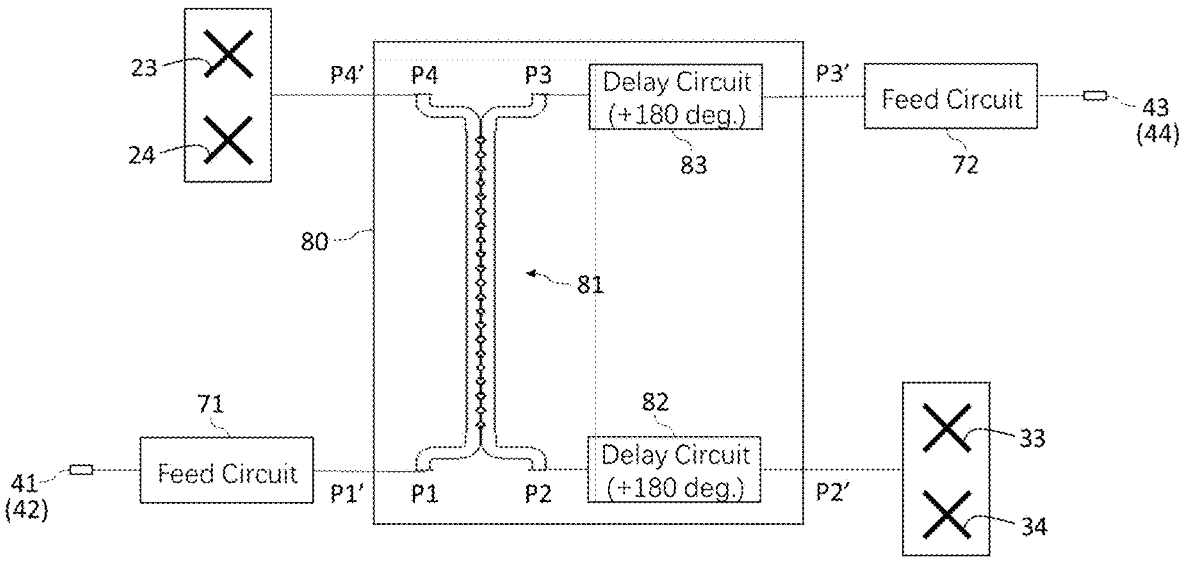
FIG. 14 is a schematic view of an implementation of a power coupling circuit using the directional coupler shown in FIG. 3 in the base station antenna according to an example of the present disclosure.
Figure 15:
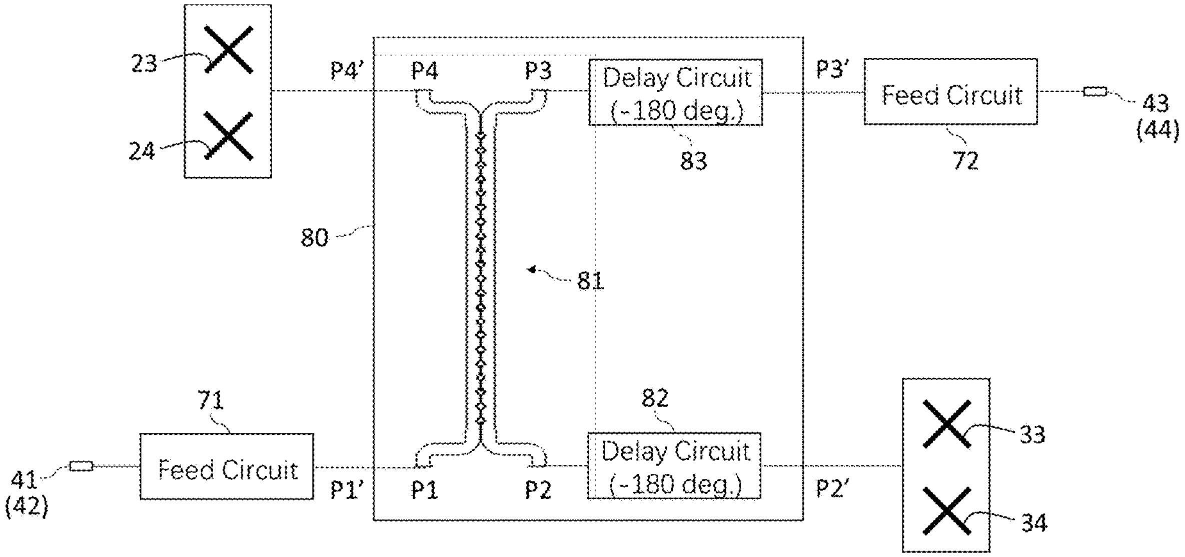
FIG. 15 is a schematic view of an implementation of a power coupling circuit using the directional coupler shown in FIG. 3 in the base station antenna according to an example of the present disclosure.

It should be understood that since a signal with 180-degree phase advance is exactly one cycle ahead of a signal with 180-degree phase delay, in other embodiments, the first delay circuit 82 and the second delay circuit 83 may both cause the output signal to be phase-advanced by 180 degrees compared to the input signal, as shown in FIG. 14, or may both cause the output signal to be phase-delayed by 180 degrees compared to the input signal, as shown in FIG. 15. In these cases, the electrical length from port P3' to port P2' is equal to the electrical length from port P4' to port P1' plus/minus the electrical length of a wavelength rather than the electrical length from port P4' to port P1', but the relative phase between the signals output by each port of the power coupling circuit 80 are still consistent with the relative phase between the signals output by each port of the power coupling circuit 80 in the embodiment shown in FIG. 6.

Some implementations of delay circuits 82 and 83 with 180 degree phase advance/delay are briefly described above. It should be understood that any known method capable of achieving phase advance/delay (or "phase shift") may be used to implement the delay circuit in the base station antenna according to any example of the present disclosure. The Chinese patent application disclosed as CN107546486A provides an antenna feed element with a constant inverted phase. This antenna feed element includes two transmission lines, such as two coaxial cable segments, with the center conductor and outer conductor of the two coaxial cable segments cross-connected to provide a broadband 180 degree inverted phase. That is, the antenna feed element provides a 180 degree phase shift to make the phase advance or delay by 180 degrees at all frequencies (not just at the center frequency). Thus, the first delay circuit 82 or the second delay circuit 83 may be implemented by the antenna feed element.

Figure 11:
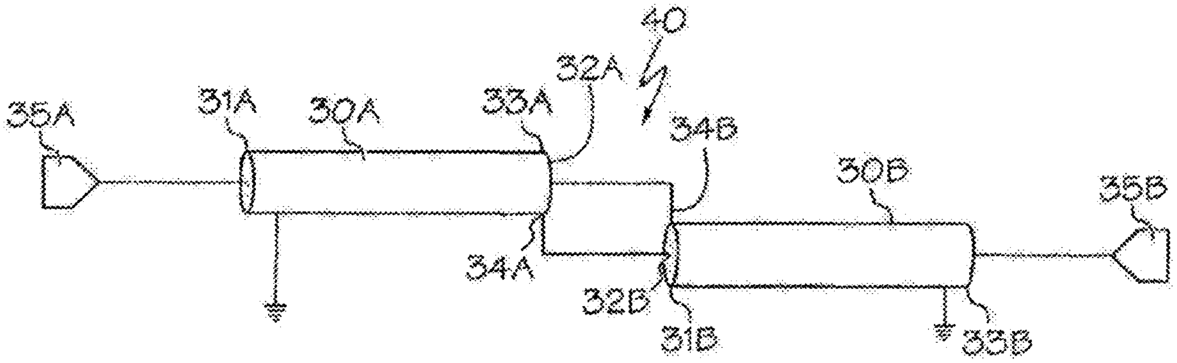
FIG. 11 is a schematic view of an antenna feed element associated with the present disclosure, which may be used to implement a delay circuit in a power coupling circuit in a base station antenna according to an example of the present disclosure.

Specifically, as shown in FIG. 11, the antenna feed element includes an input port 35A, two coaxial cables 30A, 30B, and an output port 35B. The input port 35A is connected at a first end 31A of the first coaxial cable 30A to the inner conductor 32A of the first coaxial cable 30A. The outer conductor 34A of the first coaxial cable 30A is grounded at the first end 31A of the first coaxial cable 30A. The first coaxial cable 30A and the second coaxial cable 30B are joined together at the second end 33A of the first coaxial cable 30A and the first end 31B of the second coaxial cable 30B by a crossover connection 40. In particular, in the crossover connection 40, the inner conductor 32A of the first coaxial cable 30A is connected to the outer conductor 34B of the second coaxial cable 30B at the second end 33A of the first coaxial cable, and the outer conductor 34A of the first coaxial cable 30A is connected to the inner conductor 32B of the second coaxial cable 30B at the first end 31B of the second coaxial cable 30B. The outer conductor 34B of the second coaxial cable 30B is grounded at the second end 33B of the second coaxial cable 30B, and the inner conductor 32B of the second coaxial cable 30B is coupled to the output port 35B at the second end 33B of the second coaxial cable 30B. By virtue of this crossover connection 40, the signal provided at the output port 358 is approximately 180 degrees out of phase with the signal that would otherwise have been provided at the output port 35B absent the crossover connection 40, assuming a similar electrical length.

In the case of implementing the first delay circuit 82 shown in FIG. 6 with the antenna feed element, the input port 35A of the antenna feed element is coupled to port P2 and the output port 35B is coupled to port P2', or vice versa, the input port 35A is coupled to port P2' and the output port 35B is coupled to port P2, so that the signal at port P2' has a phase shift of 180 degrees compared to the signal at port P2, such as a 180 degree phase advance. In the case of implementing the second delay circuit 83 shown in FIG. 6 with the antenna feed element, the input port 35A of the antenna feed element is coupled to port P3 and the output port 35B is coupled to port P3', or vice versa, the input port 35A is coupled to port P3' and the output port 35B is coupled to port P3, so that the signal at port P3' has a phase shift of 180 degrees compared to the signal at port P3, such as a 180 degree phase delay.

It should be understood that the first and second delay circuits 82, 83 and the directional coupler 81 in FIGS. 6, 14 and 15 are shown in the same box 80 so as to illustrate that the delay circuits 82, 83 and the directional coupler 81 are part of the power coupling circuit 80, not to define the delay circuits 82, 83 and the directional coupler 81 are on the same component. For example, a first delay circuit 82 or a second delay circuit 83 may be formed on different printed circuit boards with a directional coupler 81. Further, the first delay circuit 82 or the second delay circuit 83 may not only be disposed near the port of the directional coupler 81, but may also be disposed farther away from the directional coupler 81, such as on a feed board for feeding the radiating element, or on a feed stalk for supporting and feeding the radiating element, and may even be disposed on both. This is also true in the case of the first delay circuit 82 or the second delay circuit 83 is implemented with the aforementioned antenna feed element.

Figure 12:
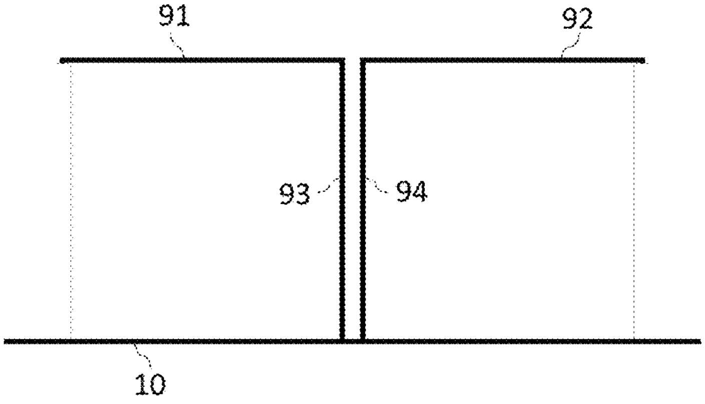
FIG. 12 schematically shows a dipole radiator in a radiating element and a feed stalk for supporting and feeding the dipole radiator.
Figure 13:
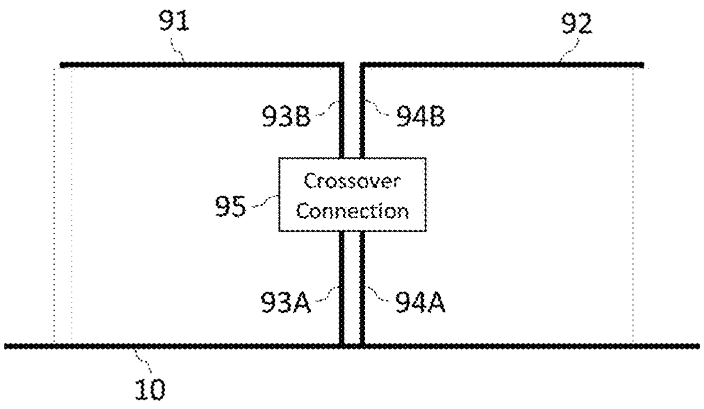
FIG. 13 is a schematic view of a crossover connection provided in a feed stalk in a base station antenna according to an example of the present disclosure.

The following describes the case where the first delay circuit 82 or the second delay circuit 83 implemented by the antenna feed element is disposed at the feed stalk referring to FIGS. 12 and 13. FIG. 12 schematically shows a dipole radiator in a radiating element and a feed stalk for supporting and feeding the dipole radiator. The dipole radiator includes radiating arms 91, 92 that extending oppositely, which are supported by feed stalks 93, 94 at a certain distance in front of the reflector 10, respectively. The feed stalks 93, 94 is coupled to the transmission line for feeding the dipole radiator, such as a microstrip line transmission line, a coaxial cable transmission line, or the like. One of the feed stalks 93, 94 is coupled to the transmission conductor of the transmission line and the other is coupled to the ground conductor of the transmission line so as to feed the dipole radiator. For example, the feed stalk 93 is coupled to the inner conductor of the coaxial cable, and the feed stalk 94 is coupled to the outer conductor of the coaxial cable. In the case that the first delay circuit 82 or the second delay circuit 83 is disposed at the feed stalks, a crossover connection 95 may be added to the feed stalks 93, 94, as shown in FIG. 13. The crossover connection 95 may be similar to the aforementioned crossover connection 40, the lower section of the feed stalks 93A, 94A may be similar to the aforementioned coaxial cable 30A, the upper section of the feed stalks 93B, 94B may be similar to the aforementioned coaxial cable 30B, so that the feed stalks 93, 94 with the crossover connection 95 can provide a phase shift of 180 degrees compared to the feed stalks 93, 94 without a crossover connection. Although not shown in the drawings, it should be understood that in further embodiment, the crossover connection 95 may be disposed at the bottom end of the feed stalks 93, 94, for example at the junction of the feed stalks 93, 94 to the feed line on the feed board. The feed board is disposed on the front surface of the reflector 10, on which feed lines for feeding the radiating element are formed. In this further embodiment, the feed line on the feed board may be similar to the aforementioned coaxial cable 30A, the feed stalks 93, 94 may be similar to the aforementioned coaxial cable 30B, and the crossover connection 95 may be located at the junction of the feed line and the feed stalks 93, 94.

Figure 8:
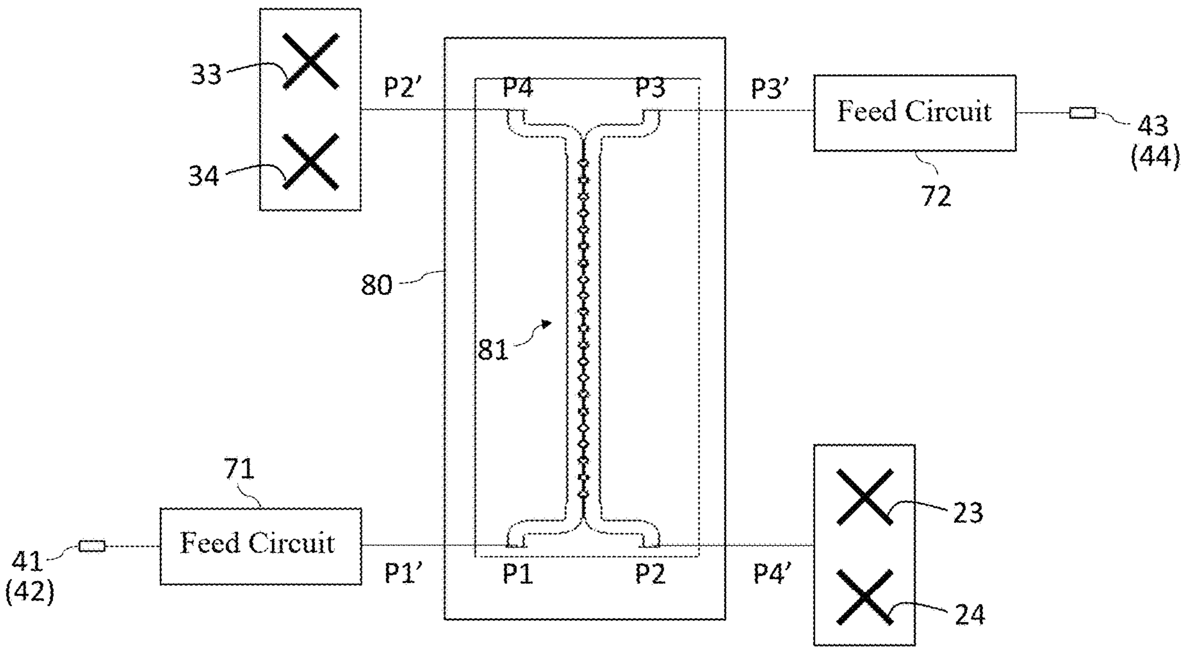
FIG. 8 is a schematic view of an implementation of a power coupling circuit using the directional coupler shown in FIG. 3 in the base station antenna according to an example of the present disclosure.

FIG. 8 is a schematic view of an implementation of power coupling circuit 80 using directional coupler 81 shown in FIG. 3 in the base station antenna according to an embodiment of the present disclosure. Power coupling circuit 80 comprises port P1' to port P4'. Port P1 of directional coupler 81 is used as port P1' of power coupling circuit 80, port P2 of directional coupler 81 is used as port P4' of power coupling circuit 80, port P3 of directional coupler 81 is used as port P3' of power coupling circuit 80, and port P4 of directional coupler 81 is used as port P2' of power coupling circuit 80. Port P1' of power coupling circuit 80 is coupled to RF port 41 (or 42) via feed circuit 71 dedicated to the first array to receive the first RF signal for the first array. Port P4' is coupled to radiating elements 23 and 24 in column 20 to feed the second component of the first RF signal to radiating elements 23 and 24, and port P2' is coupled to radiating elements 33 and 34 in column 30 to feed the first component of the first RF signal to radiating elements 33 and 34. Port P3' of power coupling circuit 80 is coupled to RF port 43 (or 44) via feed circuit 72 dedicated to the second array to receive the second RF signal for the second array. As port P2' is coupled to radiating elements 33 and 34 in column 30, a second component of the second RF signal may be fed to radiating elements 33 and 34. As port P4' is coupled to radiating elements 23 and 24 in column 20, a first component of the second RF signal may be fed to radiating elements 23 and 24.

It can be seen that, as compared to the power coupling circuit shown in FIG. 4, power coupling circuit 80 shown in FIG. 8 swaps the connections of the coupled ports and output ports of directional coupler 81. Due to the 90-degree phase advance of the signal output from the coupled port of directional coupler 81 as compared to the signal at the output port, the signal at the output port is phase-delayed by 90 degrees as compared to the signal output from the coupled port. As such, when port P1' of power coupling circuit 80 is used as the input port, the signal at port P2' (corresponding to the output port) is phase-delayed by 90 degrees compared to the signal at port P4' (corresponding to the coupled port), resulting in a 90-degree phase delay of the signal fed to radiating elements 33 and 34 as compared to the signal fed to radiating elements 23 and 24 in the first array. When port P3' of power coupling circuit 80 is used as the input port, the signal at port P4' (corresponding to the output port) is phase-delayed by 90 degrees as compared to the signal at port P2' (corresponding to the coupled port), resulting in a 90-degree phase delay of the signal fed to radiating elements 23 and 24 as compared to the signal fed to radiating elements 33 and 34 in the second array. In this way, by reversing the connection of the coupled port and the output port of the directional coupler, the signal fed to the radiating elements positioned on one side of the array may be phase-delayed compared to the signal fed to the corresponding radiating elements in the array, thereby effectively reducing or eliminating the azimuth squint of the radiation beam caused by the reflecting plane.

As the amplitude of the signal output from the output port of the directional coupler is typically greater than the amplitude of the signal output from the coupled port, therefore, when port P1 of coupler 81, for example, is used as the input port for inputting the first RF signal, the amplitude of the first component of the first RF signal output from port P4 is greater than the amplitude of the second component of the first RF signal output from port P2. In this way, when applying power coupling circuit 80 as shown in FIG. 8 to, for example, the first power coupling circuit 51 in FIG. 2A, the amplitude of the signal fed to radiating elements 33 and 34 positioned on one side of column 20 will be greater than the amplitude of the signal fed to the corresponding radiating elements 23 and 24 in column 20. This could lead to deformation in the radiation beam of the first array, for example, skewing in non-azimuth or non-elevation planes. As such, consideration may be given to the use of a 3 dB hybrid coupler (also known as 3 dB coupler) to implement power coupling circuit 80.

Figure 9:
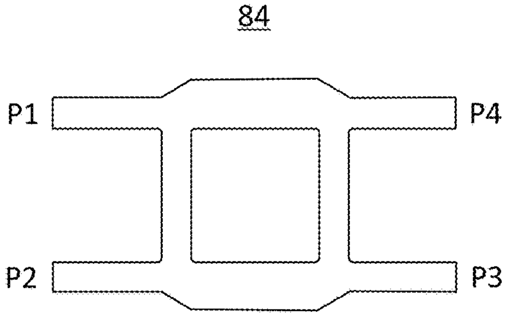
FIG. 9 is a schematic front view of a 3 dB hybrid coupler that may be used in the base station antenna according to an example of the present disclosure.

A 3 dB hybrid coupler may take various forms, including ring hybrid coupler, branch-line hybrid coupler, and coupled-line hybrid coupler, among others. FIG. 9 is a schematic front view of 3 dB hybrid coupler 84 (also referred to as "hybrid coupler 84" herein) that may be used in the base station antenna according to an embodiment of the present disclosure, illustrating a branch-line hybrid form of 3 dB hybrid coupler 84. The hybrid coupler 84 has ports P1 to P4. When port P1 is used as the input port, the output power at both port P3 and port P4 is half of the input power, and the signal output from port P3 is phase-delayed by 90 degrees as compared to the signal output from port P4. When port P2 is used as the input port, the output power at both port P3 and port P4 is half of the input power, and the signal output from port P4 is phase-delayed by 90 degrees as compared to the signal output from port P3.

Figure 10:
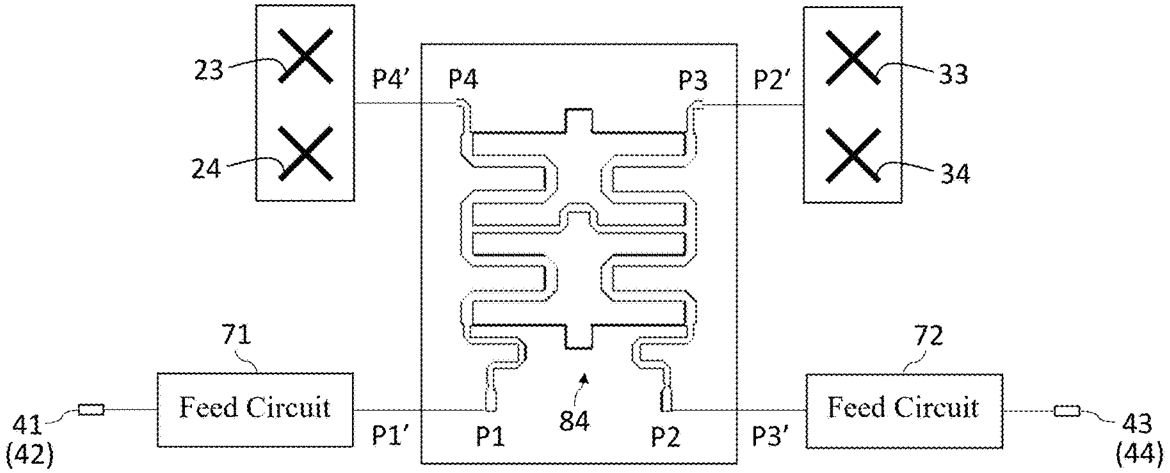
FIG. 10 is a schematic view of an implementation of a power coupling circuit using a 3 dB hybrid coupler in the base station antenna according to an example of the present disclosure.

FIG. 10 is a schematic view of the implementation of power coupling circuit 80 using a 3 dB hybrid coupler in the base station antenna according to an example of the present disclosure. The 3 dB hybrid coupler 84 shown in FIG. 10 is a modified version of the 3 dB hybrid coupler 84 shown in FIG. 9. Power coupling circuit 80 comprises port P1' to port P4'. In this example, port P1 of 3 dB hybrid coupler 84 is used as port P1' of power coupling circuit 80, port P2 of 3 dB hybrid coupler 84 is used as port P3' of power coupling circuit 80, port P3 of 3 dB hybrid coupler 84 is used as port P2' of power coupling circuit 80, and port P4 of 3 dB hybrid coupler 84 is used as port P4' of power coupling circuit 80. Port P1' of power coupling circuit 80 is coupled to RF port 41 (or 42) via feed circuit 71 dedicated to the first array to receive the first RF signal for the first array. Port P4' is coupled to radiating elements 23 and 24 in column 20 to feed the first component of the first RF signal to radiating elements 23 and 24, and port P2' is coupled to radiating elements 33 and 34 in column 30 to feed the second component of the first RF signal to radiating elements 33 and 34. Among them, the amplitude of the first component of the first RF signal is essentially equal to the amplitude of the second component of the first RF signal, and the second component of the first RF signal is phase-delayed by 90 degrees compared to the first component of the first RF signal. Port P3' of power coupling circuit 80 is coupled to RF port 43 (or 44) via feed circuit 72 dedicated to the second array to receive the second RF signal for the second array. As port P2' is coupled to radiating elements 33 and 34 in column 30, a first component of the second RF signal may be fed to radiating elements 33 and 34. As port P4' is coupled to radiating elements 23 and 24 in column 20, a second component of the second RF signal may be fed to radiating elements 23 and 24. Among them, the amplitude of the first component of the second RF signal is essentially equal to the amplitude of the second component of the second RF signal, and the second component of the second RF signal is phase-delayed by 90 degrees compared to the first component of the second RF signal. In this way, the signal fed to the radiating elements positioned on one side of the array may be phase-delayed compared to the signal fed to the corresponding radiating elements in the array, thereby effectively reducing or eliminating the azimuth squint of the radiation beam caused by the reflecting plane.

In the descriptions of the above examples, they have a phase difference (advance or delay) of 90 degrees or its multiples are used for illustration purposes. It should be understood that phase differences of other degrees may also achieve the technical effects of the present disclosure. Furthermore, the present disclosure is illustrated by reference to a base station antenna capable of implementing MIMO applications. It should be understood that the principles of the present disclosure are not limited to base station antennas capable of implementing MIMO applications and are equally applicable to base station antennas that do not include MIMO applications.

While specific examples of the present disclosure have been described in detail through examples, it should be understood by those skilled in the art that the above examples are provided for illustration purposes and are not intended to limit the scope of the present disclosure. The various examples disclosed herein may be combined arbitrarily without departing from the spirit and scope of the present disclosure. Those skilled in the art should also understand that various modifications may be made to the examples without departing from the scope and spirit of the present disclosure. The scope of the present disclosure is defined by the attached claims.

That which is claimed is:

1. A base station antenna, comprising:

a first RF port, a second RF port, a first column of radiating elements that extends in a longitudinal direction, the first column of radiating elements coupled to the first RF port;

a second column of radiating elements that extends in the longitudinal direction, the second column of radiating elements coupled to the second RF port; and a power coupling circuit, wherein a first radiating element in the second column of radiating elements is coupled to the first RF port via the power coupling circuit, and the phase of the RF signal fed to the first radiating element in the second column of radiating elements is not advanced as compared to the phase of the RF signal fed to the first radiating element in the first column of radiating elements; and wherein a second radiating element in the first column of radiating elements is coupled to the second RF port via the power coupling circuit, and the phase of the RF signal fed to the second radiating element in the first column of radiating elements is not advanced as compared to the phase of the RF signal fed to the second radiating element in the second column of radiating elements.

2. The base station antenna according to claim 1, wherein the RF signal output by the power coupling circuit that is fed to the first radiating element in the second column of radiating elements is phase-delayed by 90 degrees compared to the RF signal fed to the first radiating element in the first column of radiating elements, so that the phase of the RF signal fed to the first radiating element in the second column of radiating elements is not advanced as compared to the phase of the RF signal fed to the first radiating element in the first column of radiating elements.

3. The base station antenna according to claim 1, wherein the RF signal output by the power coupling circuit that is fed to the second radiating element in the first column of radiating elements is phase-delayed by 90 degrees compared to the RF signal fed to the second radiating element in the second column of radiating elements, so that the phase of the RF signal fed to the second radiating element in the first column of radiating elements is not advanced as compared to the phase of the RF signal fed to the second radiating element in the second column of radiating elements.

4. The base station antenna according to claim 1, wherein the power coupling circuit comprises:

a first port coupled to the first RF port to receive a first RF signal;

a second port operable to output a first component of the first RF signal, and is coupled to a first radiating element in the first column of radiating elements to feed the first component of the first RF signal thereto; and a third port operable to output a second component of the first RF signal, and is coupled to the first radiating element in the second column of radiating elements to feed the second component of the first RF signal thereto;

wherein the power coupling circuit is configured such that the phase of the second component of the first RF signal at the third port is not advanced compared to the phase of the first component of the first RF signal at the second port.

5. The base station antenna according to claim 4, wherein the power coupling circuit further comprises:

a fourth port coupled to the second RF port to receive a second RF signal;

the third port further operable to output a first component of a second RF signal, and is further coupled to the second radiating element in the first column of radiating elements to feed the first component of the second RF signal thereto;

the second port further operable to output a second component of the second RF signal, and is further coupled to the second radiating element in the first column of radiating elements to feed the second component of the second RF signal thereto;

wherein the power coupling circuit is further configured such that the phase of the second component of the second RF signal at the second port is not advanced compared to the phase of the first component of the second RF signal at the third port.

6. The base station antenna according to claim 5, wherein:

the amplitude of the first component of the first RF signal is not less than the amplitude of the second component of the first RF signal, and the amplitude of the first component of the second RF signal is not less than the amplitude of the second component of the second RF signal.

7. The base station antenna according to claim 5, wherein the power coupling circuit further comprises:

a first delay circuit configured such that the phase advance of the signal passing therethrough is not less than 90 degrees;

a second delay circuit configured such that the phase delay of the signal passing therethrough equals the phase advance brought about by the first delay circuit; and a directional coupler, wherein the input port of the directional coupler is used as the first port;

the output port of the directional coupler is used the second port;

the coupled port of the directional coupler is coupled to the third port via the first delay circuit; and the isolated port of the directional coupler is coupled to the fourth port via the second delay circuit.

8. The base station antenna according to claim 7, wherein the first delay circuit is configured to introduce a phase advance of 180 degrees to the signal passing therethrough, and the second delay circuit is configured to introduce a phase delay of 180 degrees to the signal passing therethrough.

9. The base station antenna according to claim 7, wherein the first delay circuit or the second delay circuit includes two cross-connected transmission lines.

10. The base station antenna according to claim 9, wherein the two cross-connected transmission lines includes feed stalks with a crossover connection.

11. The base station antenna according to claim 5, wherein the power coupling circuit further comprises:

a first delay circuit configured such that the phase delay of the signal passing therethrough is not less than 90 degrees;

a second delay circuit configured such that the phase advance of the signal passing therethrough equals the phase advance brought about by the first delay circuit; and a directional coupler, wherein the input port of the directional coupler is used as the first port;

the output port of the directional coupler is used the second port;

the coupled port of the directional coupler is coupled to the third port via the first delay circuit; and the isolated port of the directional coupler is coupled to the fourth port via the second delay circuit.

12. The base station antenna according to claim 11, wherein the first delay circuit is configured to introduce a phase delay of 180 degrees to the signal passing therethrough, and the second delay circuit is configured to introduce a phase advance of 180 degrees to the signal passing therethrough.

13. The base station antenna according to claim 5, wherein the power coupling circuit further comprises:

a first delay circuit configured such that the phase advance of the signal passing therethrough is 180 degrees;

a second delay circuit configured such that the phase advance of the signal passing therethrough is 180 degrees; and a directional coupler, wherein the input port of the directional coupler is used as the first port;

the output port of the directional coupler is used the second port;

the coupled port of the directional coupler is coupled to the third port via the first delay circuit; and the isolated port of the directional coupler is coupled to the fourth port via the second delay circuit.

14. The base station antenna according to claim 5, wherein the power coupling circuit further comprises:

a first delay circuit configured such that the phase delay of the signal passing therethrough is 180 degrees;

a second delay circuit configured such that the phase delay of the signal passing therethrough is 180 degrees; and a directional coupler, wherein the input port of the directional coupler is used as the first port;

the output port of the directional coupler is used the second port;

the coupled port of the directional coupler is coupled to the third port via the first delay circuit; and the isolated port of the directional coupler is coupled to the fourth port via the second delay circuit.

15. The base station antenna according to claim 5, wherein the power coupling circuit further comprises a directional coupler, wherein:

the input port of the directional coupler is used as the first port;

the coupled port of the directional coupler is used as the second port;

the output port of the directional coupler is used as the third port; and the isolated port of the directional coupler is used as the fourth port.

16. The base station antenna according to claim 15, wherein the directional coupler comprises a 3 dB hybrid coupler.

17. A base station antenna, comprising:

a reflecting plane extending in a longitudinal direction; and an array positioned in front of the reflecting plane, the array comprising:

a column formed by a plurality of first radiating elements arranged in the longitudinal direction, where the column is a first distance from a first side edge of the reflecting plane and a second distance from a second side edge of the reflecting plane, where the first distance is not equal to the second distance so that a first radiation beam generated by the column has a first squint angle in the azimuth plane; and a second radiating element positioned on one side of the column, where the second radiating element is configured such that there is a phase difference between the RF signal fed thereto and the RF signal fed to a corresponding first radiating element in the column, so that a second radiation beam generated by the array has a second squint angle in the azimuth plane that is less than the first squint angle.

18. The base station antenna according to claim 17, wherein the first distance is less than the second distance such that the radiation beam generated by the column squints towards a first side in the azimuth plane, and the second radiating element is positioned on a second side of the column and is configured such that the RF signal fed thereto is phase-delayed compared to the RF signal fed to the corresponding first radiating element in the column.

19. The base station antenna according to claim 17, wherein the first distance is less than the second distance such that the radiation beam generated by the column squints towards a first side in the azimuth plane, and the second radiating element is positioned on a first side of the column and is configured such that the RF signal fed thereto is phase-advanced compared to the RF signal fed to the corresponding first radiating element in the column.

20. The base station antenna according to claim 17, further comprising:

a power coupling circuit configured to couple the second radiating element to the corresponding first radiating element in the column, thereby introducing a phase difference between the RF signal fed to the second radiating element and the RF signal fed to the corresponding first radiating element in the column.

* * * * *